United States Patent
Orillard et al.

(10) Patent No.: US 10,061,178 B2
(45) Date of Patent: Aug. 28, 2018

(54) GLAZING HAVING SWITCHABLE OPTICAL PROPERTIES

(71) Applicant: SAINT-GOBAIN GLASS FRANCE, Courbevoie (FR) (FR)

(72) Inventors: Julien Orillard, Bern (DE); Olivier Selles, Paris (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 320 days.

(21) Appl. No.: 14/437,480

(22) PCT Filed: Oct. 8, 2013

(86) PCT No.: PCT/EP2013/070870
§ 371 (c)(1),
(2) Date: Apr. 21, 2015

(87) PCT Pub. No.: WO2014/072138
PCT Pub. Date: May 15, 2014

(65) Prior Publication Data
US 2015/0301423 A1 Oct. 22, 2015

(30) Foreign Application Priority Data
Nov. 8, 2012 (EP) ..................... 12191780

(51) Int. Cl.
*G02F 1/15* (2006.01)
*G02F 1/157* (2006.01)
(Continued)

(52) U.S. Cl.
CPC ............ *G02F 1/157* (2013.01); *B29C 65/002* (2013.01); *B29C 65/02* (2013.01);
(Continued)

(58) Field of Classification Search
CPC . G02F 1/163; G02F 1/157; G02F 1/15; G02F 1/161; G02F 1/167;
(Continued)

(56) References Cited

U.S. PATENT DOCUMENTS

| 5,657,149 A | 8/1997 | Buffat et al. |
| 6,084,702 A | 7/2000 | Byker et al. |

(Continued)

FOREIGN PATENT DOCUMENTS

| DE | 4422830 | 1/1995 |
| DE | 19616841 | 10/1996 |

(Continued)

OTHER PUBLICATIONS

Written Opinion issued for International Application No. PCT/EP2013/070870 filed on Oct. 8, 2013 in the name of Saint-Gobain Glass France. dated Jan. 7, 2014.
(Continued)

*Primary Examiner* — Evelyn A Lester
(74) *Attorney, Agent, or Firm* — Steinfl + Bruno, LLP

(57) ABSTRACT

A glazing having switchable optical properties is described, including a transparent substrate having an outer surface and an inner surface, a reflection layer on the outer surface and/or on the inner surface and a switchable functional element arranged on the interior side with respect to the reflection layer. The reflection layer contains a material having a refractive index $n_R$ of 1.6 to 2.5. The product of the refractive index $n_R$ and the thickness d of the reflection layer is from 250 nm to 960 nm.

25 Claims, 4 Drawing Sheets

Figure 1:
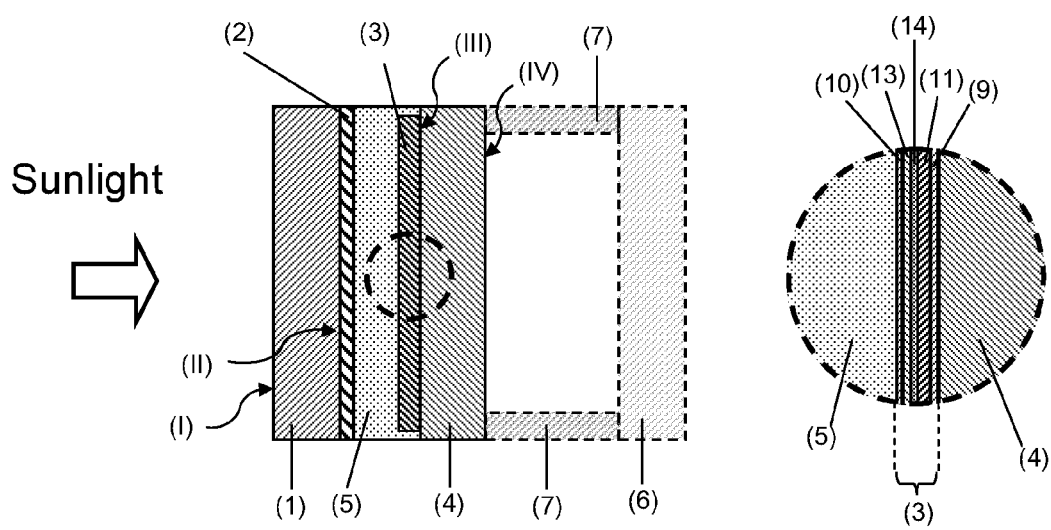

(51) Int. Cl.
  *B32B 17/10*   (2006.01)
  *C03C 17/22*   (2006.01)
  *C03C 17/23*   (2006.01)
  *B29C 65/00*   (2006.01)
  *B29C 65/02*   (2006.01)
  *B32B 27/30*   (2006.01)
  *B32B 37/06*   (2006.01)
  *B32B 37/10*   (2006.01)
  *B32B 37/18*   (2006.01)
  *E06B 9/24*    (2006.01)
  *G02F 1/01*    (2006.01)
  *G02F 1/163*   (2006.01)
  *G02F 1/19*    (2006.01)
  *G02F 1/00*    (2006.01)
  *G02F 1/167*   (2006.01)
  *G02F 1/161*   (2006.01)
  *B29K 55/00*   (2006.01)
  *B29L 31/00*   (2006.01)

(52) U.S. Cl.
  CPC .. *B32B 17/10045* (2013.01); *B32B 17/10055* (2013.01); *B32B 17/10201* (2013.01); *B32B 17/10477* (2013.01); *B32B 17/10495* (2013.01); *B32B 17/10761* (2013.01); *B32B 27/30* (2013.01); *B32B 37/06* (2013.01); *B32B 37/10* (2013.01); *B32B 37/1018* (2013.01); *B32B 37/182* (2013.01); *C03C 17/225* (2013.01); *C03C 17/23* (2013.01); *B29K 2055/00* (2013.01); *B29L 2031/7782* (2013.01); *B32B 2250/04* (2013.01); *B32B 2307/40* (2013.01); *B32B 2307/412* (2013.01); *B32B 2329/06* (2013.01); *B32B 2419/00* (2013.01); *B32B 2551/00* (2013.01); *E06B 2009/2405* (2013.01); *E06B 2009/2417* (2013.01); *G02F 1/0018* (2013.01); *G02F 1/0107* (2013.01); *G02F 1/15* (2013.01); *G02F 1/161* (2013.01); *G02F 1/163* (2013.01); *G02F 1/167* (2013.01); *G02F 1/19* (2013.01); *G02F 2001/1512* (2013.01); *G02F 2202/14* (2013.01)

(58) Field of Classification Search
  CPC ........... G02F 2001/1512; G02F 1/0018; G02F 2202/14; G02F 1/0107; G02F 1/19; E06B 2009/2405; E06B 2009/2417; C03C 17/23

USPC .................................................. 359/265–275
  See application file for complete search history.

(56) References Cited

U.S. PATENT DOCUMENTS

| | | | |
|---|---|---|---|
| 6,423,414 B1 | 7/2002 | Legrand et al. | |
| 6,746,775 B1 | 6/2004 | Boire et al. | |
| 6,819,467 B2* | 11/2004 | Lynam | B32B 17/10 359/265 |
| 2005/0147825 A1 | 7/2005 | Arnaud et al. | |
| 2012/0026573 A1 | 2/2012 | Collins et al. | |

FOREIGN PATENT DOCUMENTS

| | | |
|---|---|---|
| DE | 202004018979 | 3/2005 |
| DE | 102008026339 | 12/2009 |
| EP | 0521602 | 1/1993 |
| EP | 0573325 | 12/1993 |
| EP | 0645352 | 3/1995 |
| EP | 0825478 | 2/1998 |
| EP | 1862849 | 12/2007 |
| FR | 2961609 | 12/2011 |
| JP | S57144504 A | 9/1982 |
| JP | S58208154 A | 12/1983 |
| JP | H0244046 A | 2/1990 |
| JP | H0695170 A | 4/1994 |
| JP | 2000214492 A | 8/2000 |
| JP | 2002509516 A | 3/2002 |
| JP | 2009086659 A | 4/2009 |
| WO | 2010147494 | 12/2010 |
| WO | 2011033313 | 3/2011 |
| WO | 2012007334 | 1/2012 |

OTHER PUBLICATIONS

International Report on Patentability issued for International Application No. PCT/EP2013/070870 filed on Oct. 8, 2013 in the name of Saint-Gobain Glass France. dated May 12, 2015.

PCT International Search Report dated Jan. 7, 2014 for PCT/EP2013/070870 filed on Oct. 8, 2013 in the name of Saint-Gobain Glass France.

* cited by examiner

GLAZING HAVING SWITCHABLE OPTICAL PROPERTIES

CROSS REFERENCE TO RELATED APPLICATIONS

The present application is the US national stage of International Patent Application PCT/EP2013/070870 filed internationally on Oct. 8, 2013 which, in turn, claims priority to European Patent Application No. 12191780.1 filed on Nov. 8, 2012.

The invention relates to a glazing having switchable optical properties, a method for its production, and its use.

Glazings are known, which include a functional layer by means of which the optical properties of the glazing can be altered. Electrochromic glazings that include an electrochemically active layer between two transparent flat electrodes are an example of this. The transmittance properties of the active layer can be electrically switched by the voltage applied to the flat electrodes. Electrochromic glazings are known, for example, from US 20120026573 A1 and WO 2012007334 A1.

Glazings having switchable optical properties can be used, for example, as windowpanes of buildings. However, the switching state of such glazings affects the color appearance of the light reflected into the external environment. If a plurality of switchable windowpanes are in different switching states, this results in a nonuniform and, consequently, not very aesthetic appearance of the building.

A coating, by means of which a uniform appearance of a glazing is ensured, is known from EP 0645352 B1. The coating, whose primary purpose is the reflection of thermal radiation, consists of a structure of different individual layers, as a result of which time-consuming and cost-intensive production methods are essential. An electrically switchable glazing having an anti-reflection coating, by means of which the color appearance of the glazing can be adapted is known from U.S. Pat. No. 6,746,775 B1. Such an antireflection coating can, however, depending on the observation angle, result in different color appearances, which is frequently undesirable for aesthetic reasons.

The object of the present invention is to provide an improved glazing having switchable optical properties. The glazing should be simple and economical to produce and have a color appearance of the light reflected into the external environment independent of the switching state and the observation angle.

The object of the present invention is accomplished according to the invention by a glazing having switchable optical properties in accordance with independent claim 1. Preferred embodiments emerge from the subclaims.

The glazing according to the invention having switchable optical properties comprises at least the following characteristics:
- a transparent substrate having an outer surface and an inner surface,
- a reflection layer on the outer surface and/or on the inner surface of the substrate, and
- a switchable functional element arranged on the interior side relative to the reflection layer, wherein the reflection layer contains a material having a refractive index $n_R$ from 1.6 to 2.55 and wherein the product of the refractive index $n_R$ and the thickness d of the reflection layer is from 250 nm to 960 nm.

In the context of the invention, the reflection layer is a single and homogeneous layer. The reflection layer is, in particular, not a layer structure of a plurality of individual layers.

The glazing according to the invention is intended, in an opening, for example, of a motor vehicle or of a building, to separate the interior from the external environment. In the context of the invention, "outer surface" refers to that surface of the substrate, which, in the installed position of the glazing, faces the external environment. In the context of the invention, "inner surface" refers to that surface of the substrate, which, in the installed position of the glazing, faces the interior.

The values indicated for the refractive index $n_R$ are measured at a wavelength of 550 nm.

When an element contains at least one material, this includes, in the context of the invention, the case in which the element is made of the material.

In the context of the invention, the term "a glazing having switchable optical properties" refers not only to a glazing whose optical properties, for example, the transmittance of visible light, can be switched between two discrete states, for example, an opaque and a transparent state. It also includes those glazings whose optical properties are continuously adjustable.

According to the invention, the switchable functional element is arranged on the interior side of the reflection layer. This means that the functional element is a shorter distance from the interior than the reflection layer. Light passing through the glazing from the external environment thus first strikes the reflection coating and then the functional element. The color appearance of the light reflected toward the external environment, also referred to in the context of the invention as "external reflection color", can be governed by the reflection layer according to the invention. The external reflection color can be selectively adjusted by the refractive index $n_R$ and the thickness d. The reflection layer results in the fact that the switching state of the functional element cannot be discerned from the outside. A building façade with a plurality of glazings according to the invention thus always has a uniform appearance independently of the switching state of the individual glazings. The external reflection color is, in addition, independent of the angle of observation such that the appearance does not change, for example, for an observer passing by the building. The reflection layer comprises, moreover, only a single layer, as a result of which the glazing can be produced simply and economically. These are major advantages of the invention.

Even a plurality of switchable functional elements can be arranged on the interior side of the reflection coating. Of course, the glazing can also have more than one reflection layer according to the invention, wherein the functional element must be arranged on the interior side of at least one reflection layer.

The refractive index $n_R$ of the material of the reflection layer is, according to the invention, from 1.6 to 2.55. The refractive index is preferably from 1.9 to 2.3. Particularly good results are obtained with this.

The reflection layer can be porous. The refractive index of the material of the reflection layer can be advantageously affected by a suitably selected porosity.

The reflection layer can be applied full surface on the surface of the substrate. This is particularly advantageous with regard to a uniform external reflection color. The substrate can, however, for example, also have a coating-free edge region, in particular, if this coating-free edge region is concealed in the installed position, for example, by frames or fastening elements.

The reflection layer preferably contains at least silicon nitride, tin oxide, silicon oxynitride, zinc oxide, zirconium oxide, aluminum nitride, indium tin oxide, tin zinc oxide, titanium zinc oxide, and/or titanium silicon oxide. The reflection layer particularly preferably contains silicon nitride. This is particularly advantageous with regard to the stability and the application of the reflection layer and the regulation of the external reflection color.

In a preferred embodiment of the invention, the light reflected into the external environment has a green color appearance. A green color appearance is obtained when the product of the refractive index $n_R$ and the thickness d of the reflection layer is from 365 nm to 400 nm, preferably from 375 nm to 390 nm, in particular roughly 385 nm. A green color appearance is alternatively obtained when the product of the refractive index $n_R$ and the thickness d of the reflection layer is from 730 nm to 800 nm, preferably from 750 nm to 780 nm, in particular roughly 770 nm.

In an alternative preferred embodiment of the invention, the light reflected into the external environment has a golden color appearance. A golden color appearance is obtained when the product of the refractive index $n_R$ and the thickness d of the reflection layer is from 435 nm to 480 nm, preferably from 440 nm to 475 nm, in particular roughly 450 nm. A golden color appearance is alternatively obtained when the product of the refractive index $n_R$ and the thickness d of the reflection layer is from 870 nm to 960 nm, preferably from 880 nm to 950 nm, in particular roughly 900 nm.

In an alternative preferred embodiment of the invention, the light reflected into the external environment has a blue color appearance. A blue color appearance is obtained when the product of the refractive index $n_R$ and the thickness d of the reflection layer is from 305 nm to 365 nm, preferably from 320 nm to 345 nm, in particular roughly 330 nm. A blue color appearance is alternatively obtained when the product of the refractive index $n_R$ and the thickness d of the reflection layer is from 610 nm to 730 nm, preferably from 640 nm to 690 nm, in particular roughly 660 nm.

In an alternative preferred embodiment of the invention, the light reflected into the external environment has a violet color appearance. A violet color appearance is obtained when the product of the refractive index $n_R$ and the thickness d of the reflection layer is from 250 nm to 300 nm, preferably from 270 nm to 285 nm, in particular roughly 280 nm. A violet color appearance is alternatively obtained when the product of the refractive index $n_R$ and the thickness d of the reflection layer from is 500 nm to 600 nm, preferably from 540 nm to 570 nm, in particular roughly 560 nm.

The reflection layer is preferably applied directly on a surface of the substrate. Preferably, no other layers, other than the reflection layer, are applied on substrate above or below the reflection layer. This is particularly advantageous with regard to simple and economical production of the glazing. However, alternatively, at least one other layer can also be arranged between the substrate and the reflection layer, for example, an adhesion-promoting layer or a barrier layer. At least one other layer can also be arranged on the surface of the reflection layer facing away from the substrate, for example, a protection layer against damage to the reflection layer.

The functional element comprises at least one functional layer which has the switchable optical properties. If the functional layer is electrically switchable, the functional layer is typically arranged between a first and a second transparent flat electrode. The flat electrodes and the functional layer are typically arranged parallel to the surface of the substrate. The flat electrodes are electrically connected to an external voltage source.

In one embodiment of the invention, the functional layer of the functional element is an electrochemically active layer. Such functional elements are known as electrochromic functional elements. The transmittance of visible light depends on the storage level of ions in the functional layer, with the ions being provided, for example, by an ion storage layer between a functional layer and a flat electrode. The transmittance can be governed by the voltage applied to the flat electrodes, which triggers a migration of the ions. Suitable functional layers contain, for example, at least tungsten oxide or vanadium oxide. Electrochromic functional elements are known, for example, from WO 2012007334 A1, US 20120026573 A1, WO 2010147494 A1, and EP 1862849 A1.

In one embodiment of the invention, the functional layer of the functional element contains liquid crystals, which are, for example, incorporated into a polymeric matrix. Such functional elements are known as PDLC functional elements (polymer dispersed liquid crystal). When no voltage is applied to the flat electrodes, the liquid crystals are oriented in a disorderly fashion, which results in strong scattering of the light passing through the functional layer. When a voltage is applied to the flat electrodes, the liquid crystals align themselves in a common direction and the transmittance of light through the functional layer is increased. Such a functional element is known, for example, from DE 102008026339 A1.

In one embodiment of the invention, the functional layer of the functional element contains suspended particles, with the absorption of light by the functional layer variable through the application of a voltage to the flat electrodes. Such functional elements are known as SPD functional elements (suspended particle device), for example, from WO 2011033313 A1.

However, the invention is not limited to electrically switchable functional elements. In one embodiment of the invention, the functional element is thermally switchable. Such functional elements include at least one functional layer, which contains a thermochromic material, for example, vanadium oxide. The thermochromic material can, for example, be applied on a pane or even, for example, incorporated into a polymeric layer. Due to changes in the crystalline structure, when a transition temperature is exceeded, thermochromic materials transition from the electrically insulating state to an electrically conducting state and change their optical properties, for example, reflectance with regard to infrared radiation and/or their color. Thermochromic functional elements are known, for example, from US 2005147825 A1 and U.S. Pat. No. 6,084,702A.

The functional element according to the invention can also be switchable with regard to optical properties based on other principles known per se. The functional element can, for example, also be a gasochromic, a photochromic, a photoelectrochromic, or a thermotropic functional element.

Common to the design of the functional element is the fact that the switching state can be discerned by an observer in the external environment based on the color of the external reflection. This effect, undesirable for the most part, is advantageously prevented by the reflection layer according to the invention.

The switchable functional element can, of course, have, besides the functional layer (and in the case of an electrically switchable functional layer, the flat electrodes), other layers known per se, for example, barrier layers, blocker layers, antireflection layers, protective layers, and/or smoothing layers.

According to the invention, the reflection layer is applied on a surface of the substrate, whereas the functional element is arranged inside the glazing according to the invention on the interior side of the reflection layer. In one embodiment of the invention, the reflection layer is arranged on the outer surface of the substrate; and the functional element is arranged on the inner surface of the substrate. The substrate can be part of a pane arrangement. The substrate can be bonded, for example, via the inner surface or via the outer surface to at least one other pane by means of a thermoplastic intermediate layer to form a composite pane. The substrate also be bonded, for example, via the inner surface or the outer surface to at least one other pane by means of at least one spacer to form an insulating glazing unit. Of course, the substrate can also be part of a pane arrangement composed of more than two individual panes.

In another embodiment of the invention, the substrate is bonded via its inner surface by means of at least one thermoplastic intermediate layer to a transparent cover pane. In that case, in the installed position of the glazing, the substrate faces the external environment, whereas the cover pane faces the interior. The cover pane has an outer surface and an inner surface, with the outer surface facing the substrate and with the inner surface facing the interior. The reflection coating is arranged on the inner surface or on the outer surface of the substrate. The functional element is arranged on the inner surface or the outer surface of the cover pane. The functional element is, alternatively, arranged in the thermoplastic intermediate layer, for example, between a first and a second thermoplastic film. The composite pane comprising the substrate, the thermoplastic intermediate layer, and the cover pane, can also be bonded to at least one other pane via the outer surface of the substrate and/or via the inner surface of the cover pane, for example, via at least one other thermoplastic intermediate layer and/or spacer.

In another embodiment of the invention, the substrate is bonded via its inner surface by means of at least one spacer to a transparent cover pane to form an insulating glazing unit. In this case, in the installed position of the glazing, the substrate faces the external environment, whereas the cover pane faces the interior. The cover pane has an outer surface and an inner surface, with the outer surface facing the substrate and with the inner surface facing the interior. The reflection coating is arranged on the inner surface or on the outer surface of the substrate. The functional element is arranged on the inner surface or on the outer surface of the cover pane. The substrate and/or the cover pane inside the insulating glazing unit can also be part of a composite pane. At least one other pane can also be bonded via spacers to the outer surface of the substrate and/or the surface of the cover pane.

The functional element can also be arranged on a surface of a cover pane, with at least one other pane arranged between the substrate and the cover pane. The other pane can be bonded to the substrate via a thermoplastic intermediate layer or at least one spacer and to the cover pane via an intermediate layer or at least one spacer.

In another embodiment of the invention, the substrate is bonded via its inner surface to a transparent cover pane. In this case, in the installed position of the glazing, the substrate faces the external environment, whereas the cover pane faces the interior. The cover pane has an outer surface and an inner surface, with the outer surface facing the substrate and with the inner surface facing the interior. The reflection coating is arranged on the inner surface or on the outer surface of the substrate. The functional element is arranged on the inner surface of the substrate (optionally, via the reflection coating) and on the outer surface of the cover pane such that the substrate and the cover pane are bonded to each other via the functional element.

The substrate preferably contains non-prestressed, partially prestressed, or prestressed glass, particularly preferably flat glass, float glass, quartz glass, borosilicate glass, soda lime glass, or clear plastics, preferably rigid clear plastics, in particular polyethylene, polypropylene, polycarbonate, polymethyl methacrylate, polystyrene, polyamide, polyester, polyvinyl chloride, and/or mixtures thereof.

In an advantageous embodiment, the substrate has a refractive index from 1.45 to 1.55. The substrate particularly preferably contains soda lime glass. The refractive index of soda lime glass is roughly 1.52.

If the glazing includes a cover pane according to the invention and/or at least one other pane, the cover pane and/or the other pane preferably contains non-prestressed, partially prestressed, or prestressed glass, particularly preferably flat glass, float glass, quartz glass, borosilicate glass, soda lime glass or clear plastics, preferably rigid clear plastics, in particular polyethylene, polypropylene, polycarbonate, polymethyl methacrylate, polystyrene, polyamide, polyester, polyvinyl chloride, and/or mixtures thereof.

The thickness of the substrate and, optionally, of the cover pane can vary widely and thus be adapted to the requirements in the individual case. The substrate and, optionally, the cover pane preferably have thicknesses from 20 µm to 10 mm, for example, from 0.5 mm to 10 mm. The substrate and/or the cover pane can, however, even have very low thicknesses, for example, from 20 µm to 100 µm. The surface area of the glazing according to the invention can vary widely, for example, from 100 $cm^2$ to 20 $m^2$. Preferably, the glazing has a surface area from 400 $cm^2$ to 6 $m^2$, as is customary for glazings of motor vehicles and of structural and architectural glazings.

The substrate and, optionally, the cover pane and/or other pane can have any three-dimensional shape. The substrate and, optionally, the cover pane and/or other panes are preferably flat or slightly or greatly curved in one or a plurality of spatial directions.

If the glazing according to the invention includes a thermoplastic intermediate layer, via which, for example, the substrate is bonded to a cover pane, the thermoplastic intermediate layer preferably includes thermoplastic plastics, such as polyvinyl butyral (PVB) and/or ethylene vinyl acetate (EVA). The intermediate layer can also contain polyurethane (PU), polypropylene (PP), polyacrylate, polyethylene (PE), polycarbonate (PC), polymethyl methacrylate, polyvinyl chloride, polyacetate resin, casting resins, acrylates, fluorinated ethylene propylenes, polyvinyl fluoride, ethylene tetrafluoroethylene, copolymers, and/or mixtures thereof. The thermoplastic intermediate layer can be formed by one or a plurality of thermoplastic films, with the thickness of a film being preferably from 0.3 mm to 3 mm.

The substrate, optionally, the cover pane, and, optionally, the other panes of the glazing can have suitable coatings, known per se, for example, antireflection coatings, nonstick coatings, scratch resistant coatings, photocatalytic coatings, or thermal radiation reflecting coatings (low-E coatings).

The object of the invention is further accomplished by a method for producing a glazing according to the invention having switchable optical properties, wherein at least a reflection layer is applied on the outer surface or on the inner surface of a transparent substrate, a functional element is applied on the outer surface or on the inner surface of a transparent cover pane or is incorporated into a thermoplastic intermediate layer, and the substrate is bonded to the cover pane via the thermoplastic intermediate layer under the action of heat, vacuum, and/or pressure.

The application of the reflection layer on the substrate can be done before, after, or simultaneously with the application of the functional element on the cover pane or the incorporation of the functional element into the intermediate layer. The substrate and the cover pane are arranged at the time of bonding such that the inner surface of the substrate and the outer surface of the cover pane face each other. The bonding of the substrate to the cover pane is preferably done after the application or incorporation of the reflection layer and the functional element. If the reflection layer and/or the functional element are applied on surfaces that are still accessible after the bonding of the substrate and the cover pane, such as, for example, the outer surface of the substrate or the inner surface of the cover pane, the application of the reflection layer and/or of the functional element can also be done after the bonding of the substrate and the cover pane.

If the functional element is an electrically switchable functional element, the electrical contacting of the flat electrodes is preferably done before the bonding of the substrate and the cover pane.

The incorporation of the functional element into the thermoplastic intermediate layer preferably includes the incorporation of the functional element between at least one first and at least one second thermoplastic film.

The bonding of the substrate and the cover pane is done by methods known per se, for example, by autoclaving methods, vacuum bag methods, vacuum ring methods, calendering methods, vacuum laminators, or by combinations thereof.

The object of the invention is further accomplished by a method for producing a glazing according to the invention having switchable optical properties, wherein at least a reflection layer is applied on the outer surface or on the inner surface of a transparent substrate, a functional element is applied on the outer surface or on the inner surface of a transparent cover pane, and the substrate is bonded to the cover pane via at least one spacer.

The application of the reflection layer on the substrate can be done before, after, or simultaneously with the application of the functional element on the cover pane. The substrate and the cover pane are arranged at the time of bonding such that the inner surface of the substrate and the outer surface of the cover pane face each other. The bonding of the substrate to the cover pane is preferably done after the application or incorporation of the reflection layer and the functional element. If the reflection layer and/or the functional element are to be applied on surfaces that are still accessible after the bonding of the substrate and the cover pane, such as, for example, the outer surface of the substrate or the inner surface of the cover pane, the application of the reflection layer and/or of the functional element can, of course, also be done after the bonding of the substrate and the cover pane.

If the functional element is an electrically switchable functional element, the electrical contacting of the flat electrodes is preferably done before the bonding of the substrate and the cover pane.

The object of the invention is further accomplished by a method for producing a glazing according to the invention having switchable optical properties, wherein at least a reflection layer is applied on the outer surface of a transparent substrate and a functional element is applied on the inner surface of the substrate.

The application of the reflection layer on the substrate can be done before, after, or simultaneously with the application of the functional element on the substrate.

The substrate is bonded, after the application of the reflection layer and of the functional element, preferably to at least one other pane to form an insulating glazing unit and/or composite pane.

The reflection layer in the method according to the invention is deposited by methods known per se, preferably by magnetically-enhanced cathodic sputtering. This is particularly advantageous with regard to simple, fast, economical, and uniform coating of the substrate. The cathodic sputtering is done in a protective gas atmosphere, for example, of argon, or in a reactive gas atmosphere, for example, by addition of oxygen or nitrogen.

The reflection layer can, however, also be applied by other methods known to the person skilled in the art, for example, by vapor deposition or chemical vapor deposition (CVD), by plasma-enhanced chemical vapor deposition (PECVD), or by wet chemical methods.

The glazing according to the invention is preferably used in buildings, particularly preferably as façade glazing or in means of transport for traffic on land, in the air, or on water.

The invention moreover includes the use of a reflection layer according to the invention in a glazing according to the invention to regulate the external reflection color.

Figure 2:
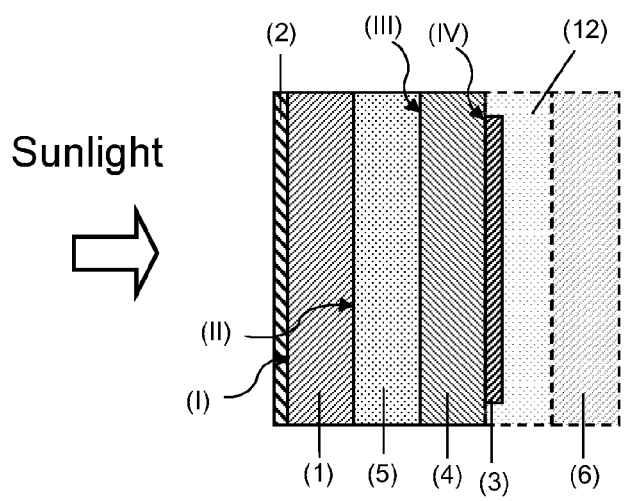
Figure 3:
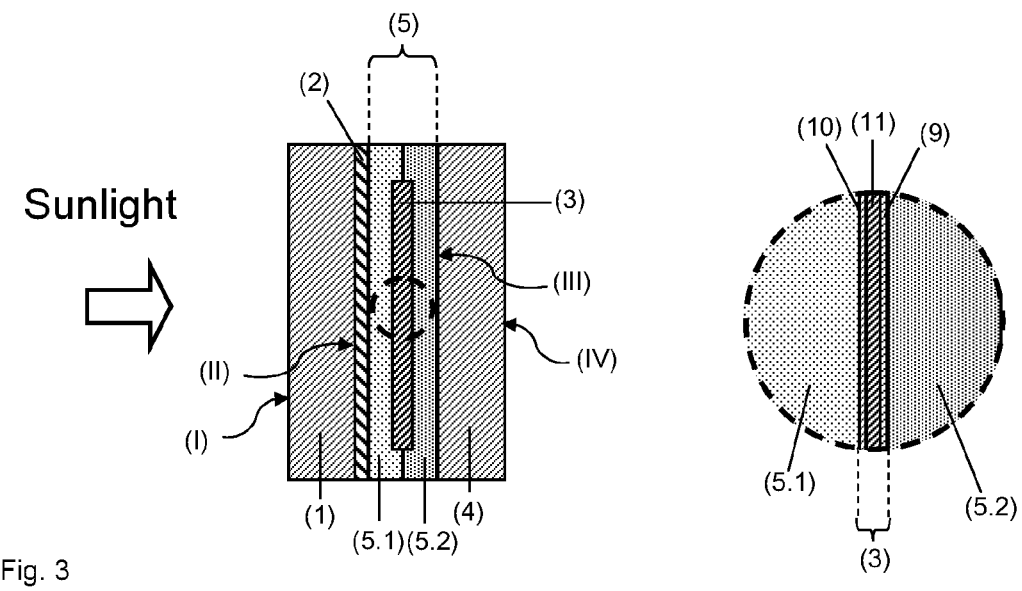
Figure 4:
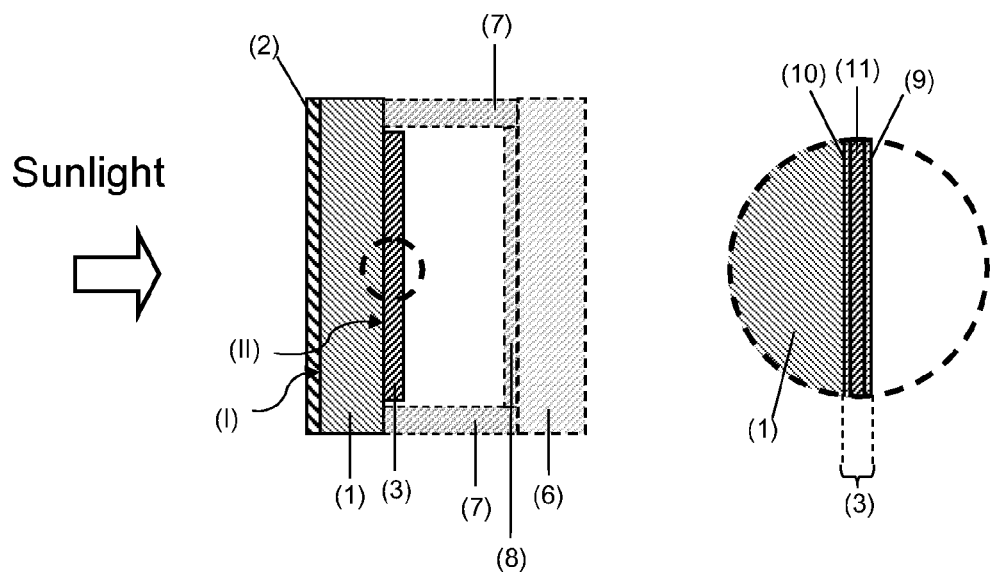
Figure 5:
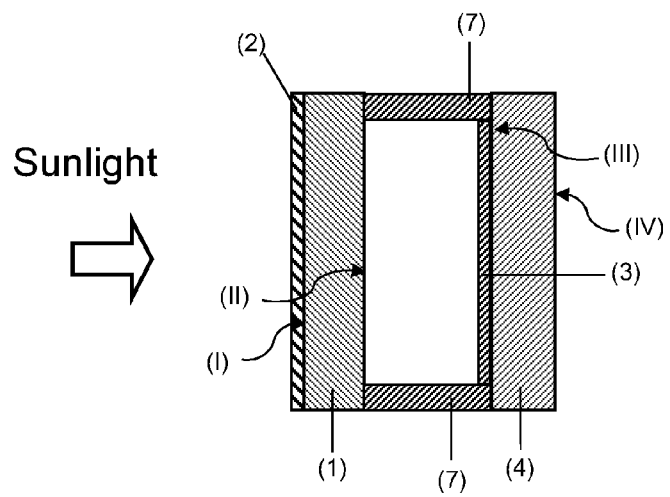
Figure 6:
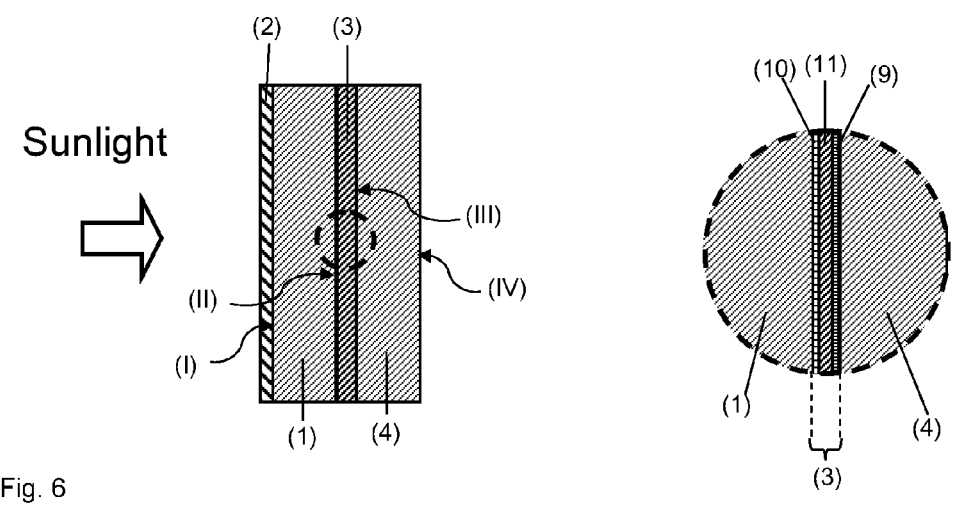
Figure 7:
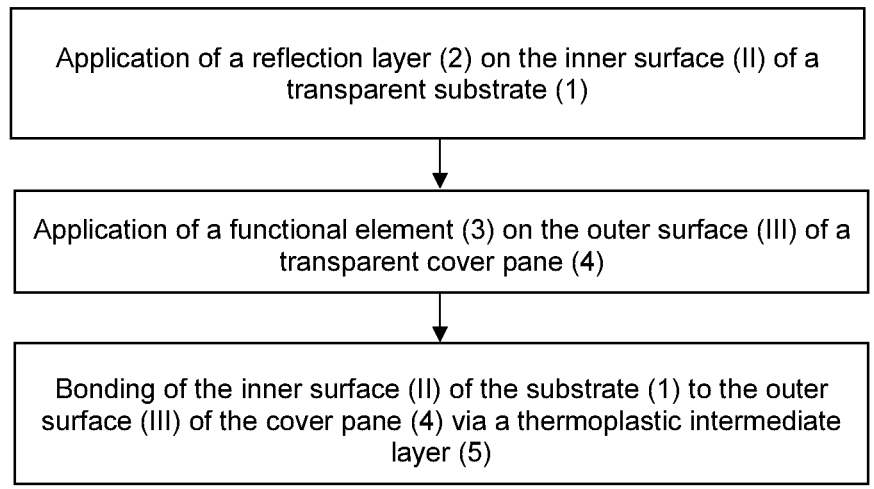
Figure 8:
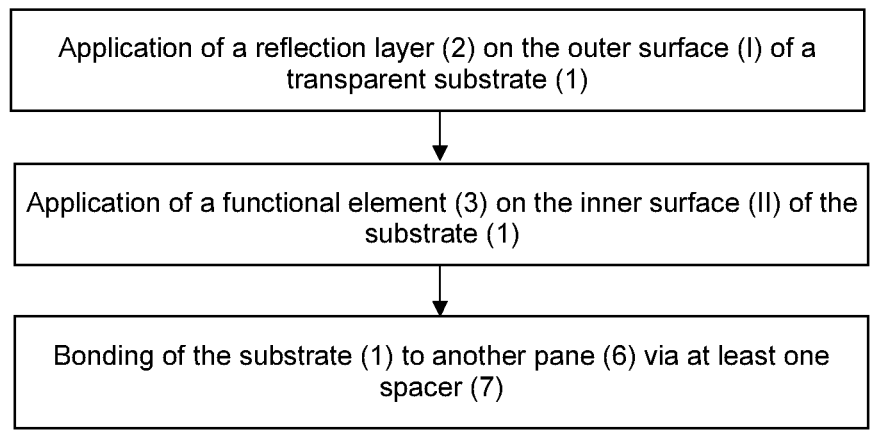

The invention is explained in detail with reference to drawings and exemplary embodiments. The drawings are schematic representations and are not true to scale. The drawings in no way restrict the invention. They depict:

FIG. 1 a cross-section through a first embodiment of the glazing according to the invention having switchable optical properties, FIG. 2 a cross-section through another embodiment of the glazing according to the invention, FIG. 3 a cross-section through another embodiment of the glazing according to the invention, FIG. 4 a cross-section through another embodiment of the glazing according to the invention, FIG. 5 a cross-section through another embodiment of the glazing according to the invention, FIG. 6 a cross-section through another embodiment of the glazing according to the invention, FIG. 7 an exemplary embodiment of the method according to the invention with reference to a flowchart, and FIG. 8 another exemplary embodiment of the method according to the invention with reference to a flowchart.

FIG. 1 depicts a cross-section through an embodiment of the glazing according to the invention having switchable optical properties. The glazing comprises a substrate 1 that is bonded via its inner surface (II) to the outer surface (III) of a cover pane 4 by means of a thermoplastic intermediate layer 5 to form a composite pane. The glazing moreover comprises another pane 6 that is bonded via a spacer 7 to the inner surface (IV) of the cover pane 4 to form an insulating glazing unit. The glazing is provided as the glazing of a building façade and is arranged, in the installed position, such that the outer surface (I) of the substrate 1 faces the external environment, and the other pane 6 faces the interior. The substrate 1, the cover pane 4, and the other pane 6 are made of soda lime glass and have thicknesses of 6 mm. The thermoplastic intermediate layer 5 made of polyvinyl butyral (PVB) has a thickness of 0.76 mm. The distance between the cover pane 4 and the other pane 6 defined by the circumferential spacers 7 is 12 mm.

A reflection layer 2 made of silicon nitride with a thickness d of 190 nm is arranged on the inner surface (II) of the substrate 1. The refractive index $n_R$ of the silicon nitride is 2.02. The product of the refractive index $n_R$ and the thickness d of the reflection layer 2 is roughly 384 nm. In this embodiment, a green color of the light reflected into the external environment is obtained by means of the reflection layer 2.

A functional element 3 is arranged on the outer surface (III) of the cover pane 4. The functional element 3 has, in the installed position of the glazing, a shorter distance to the interior than the reflection layer 2. In the context of the invention, the functional element 3 is, consequently, arranged on the interior side of the reflection layer 2. The functional element 3 is an electrically switchable, electrochromic functional element. The region around the functional element 3 identified by the circle is shown enlarged on the right. The functional element 3 includes, in the exemplary embodiment, with increasing distance from the cover pane 4, a first flat electrode 9 made of fluoride-doped tin oxide, an electrochromic functional layer 11 made of lithium-doped tungsten oxide, an electrolytic layer 14 made of $Ta_2O_5$, an ion storage layer 13 made of lithium-doped $CeO_2$, and a second flat electrode 10 made of indium tin oxide (ITO). The first flat electrode 9 and the second flat electrode 10 are connected via conductors (not shown) to an external power supply. The transmittance of visible light through the functional layer 11 depends on the storage level of lithium ions and can be switched by the voltage applied to the flat electrodes 9, 10, because, depending on the voltage applied, lithium ions can migrate between the functional layer 11 and the ion storage layer 13 through the electrolytic layer 14.

Without the reflection layer 2, the switching state of the functional element 3 would be discernible for an observer in the external environment from the color of the reflected light. In the case of a plurality of glazings each with a functional element 3 on a building façade, this can result in a nonuniform and, consequently, not very aesthetic color appearance of the façade, when the individual functional elements 3 have different switching states. By means of the reflection coating 2, a uniform external reflection color, independent of the switching state of the functional element, is obtained. The color, which can be adjusted by the refractive index $n_R$ and the thickness d of the reflection layer 2, is also independent of the observation angle. The color has, consequently, for a moving observer, no changes depending on the observation position. The reflection layer 2 also includes only a single layer such that the glazing is simple and economical to produce. These are major advantages of the invention.

FIG. 2 depicts a cross-section through another embodiment of the glazing according to the invention having switchable optical properties. The substrate 1 is bonded to the outer surface (III) of a cover pane 4 via its inner surface (II) by means of a thermoplastic intermediate layer 5. The inner surface (IV) of the cover pane 4 is bonded to another pane 6 via a second thermoplastic intermediate layer 12. The substrate 1, the cover pane 4, and the thermoplastic intermediate layer 5 are configured as in FIG. 1. The second thermoplastic intermediate layer 12 is made of PVB and has a thickness of 0.76 mm.

A functional element 3 is arranged on the inner surface (IV) of the cover pane 4. The functional element 3 is a thermochromic layer made of doped $VO_2$. The functional element 3 is thermally switchable: $VO_2$ changes upon exceeding a temperature of roughly 68° C. from a semiconductive state with high transmittance of visible light to a conductive state with reduced transmittance of visible light. The temperature of the transition between the switching states can be reduced by dopants, for example, tungsten, for example, to roughly 29° C.

A reflection layer 2 made of zirconium oxide ($ZrO_2$) with a thickness d of 200 nm is arranged on the outer surface (I) of the substrate 1. The refractive index $n_R$ of the zirconium oxide is roughly 2.22. The product of the refractive index $n_R$ and the thickness d of the reflection layer 2 is 444 nm. A golden color of the light reflected into the external environment is obtained by means of the reflection layer 2 in this embodiment.

The thermochromic material can, alternatively, also be incorporated, for example, into one of the thermoplastic intermediate layers 5, 12, which would then form the switchable functional element 3.

FIG. 3 depicts a cross-section through another embodiment of the glazing according to the invention having switchable optical properties. The substrate 1 is bonded to the outer surface (III) of the cover pane 4 via its inner surface (II) by means of a thermoplastic intermediate layer 5. The substrate 1 and the cover pane 4 are configured as in FIG. 1. The thermoplastic intermediate layer 5 comprises a first thermoplastic film 5.1 and a second thermoplastic film 5.2. The thermoplastic films 5.1 and 5.2 are made of PVB and have, in each case, a thickness of 0.76 mm.

A functional element 3 is arranged between the first thermoplastic film 5.1 and the second thermoplastic film 5.2. The functional element 3 is arranged, in the context of the invention, in the thermoplastic intermediate layer 5. The region around the functional element 3 identified by the circle is shown enlarged on the right. The functional element 3 is a PDLC functional element and comprises a functional layer 11 between a first flat electrode 9 and a second flat electrode 10. The flat electrodes 9,10 are connected via conductors (not shown) to an external power supply. The functional layer 11 contains liquid crystals that are embedded in a polymeric network. When a voltage is applied to the flat electrodes 9,10, the liquid crystals align themselves along a common direction and the transmittance of visible light through the functional layer 11 is increased.

A reflection layer 2 made of tin oxide ($SnO_2$) with a thickness d of roughly 165 nm is arranged on the inner surface (II) of the substrate 1. The refractive index $n_R$ of the tin oxide is roughly 2.00. The product of the refractive index $n_R$ and the thickness d of the reflection layer 2 is roughly 330 nm. A blue color of the light reflected into the external environment is obtained by means of the reflection layer 2.

FIG. 4 depicts a cross-section through another embodiment of the glazing according to the invention having switchable optical properties. A reflection layer 2 is arranged on the outer surface (I) of the substrate 1. A functional element 3 is arranged on the inner surface (II) of the substrate 1. The region around the functional element 3 identified by the circle is shown enlarged on the right.

The reflection layer 2 made of indium tin oxide (ITO) has a thickness d of 145 nm. The refractive index $n_R$ of the indium tin oxide is 1.92. The product of the refractive index $n_R$ and the thickness d of the reflection layer 2 is roughly 278 nm. A violet color of the light reflected into the external environment is obtained by means of the reflection layer 2 in this embodiment.

The substrate 1 is bonded, via its inner surface (II) by means of a circumferential spacer 7 to another pane 6 to form an insulating glazing unit. A heat protection coating 8 is arranged on the surface of the other pane 6 turned toward the substrate 1. Heat protection coatings (also referred to as low-E coatings) are known per se and improve the thermal comfort in the interior. Such heat protection coatings include, for example, functional layers based on silver, which reflect parts of the solar radiation in the summer, in particular in the IR range, and reduce the emission of thermal radiation via the glazing in the winter.

FIG. 5 depicts a cross-section through another embodiment of the glazing according to the invention having switchable optical properties. The substrate 1 is bonded via its inner surface (II) by means of a circumferential spacer 7 to the outer surface (III) of a cover pane 4. The substrate 1 and the cover pane 4 are configured as in FIG. 1.

A thermochromic functional element 3 is arranged on the outer surface (III) of the cover pane 4. A reflection layer 2 is arranged on the outer surface (I) of the substrate 1. The functional element 3 and the reflection layer 2 are configured as in FIG. 2.

FIG. 6 depicts a cross-section through another embodiment of the glazing according to the invention having switchable optical properties. The substrate 1 is bonded via its inner surface (II) to the outer surface (III) of a cover pane 4. A functional element 3 is arranged between the substrate 1 and the cover pane 4. The functional element 3 is arranged on the inner surface (II) of the substrate 1 and the outer surface (III) of the cover pane 4 such that the substrate 1 and the cover pane 4 are bonded via the functional element 3. The region around the functional element 3 identified by the circle is shown enlarged on the right. The functional element 3 is an electrically switchable functional element and includes a functional layer 11 between a first flat electrode 9 and a second flat electrode 10, with the first flat electrode 9 applied on the outer surface (III) and the second flat electrode applied on the inner surface (II). The flat electrodes 9,10 are connected via conductors (not shown) to an external power supply. A reflection layer 2 is arranged on the outer surface (I) of the substrate 1.

FIG. 7 depicts an exemplary embodiment of the method according to the invention for producing a glazing having switchable optical properties.

The bonding of the cover pane and the substrate can also be done, in an alternative embodiment, via at least one spacer.

FIG. 8 depicts another exemplary embodiment of the method according to the invention for producing a glazing having switchable optical properties.

It was unexpected and surprising for the person skilled in the art that, by means of the reflection layer according to the invention, which is simple and economical to apply, effective regulation of the external reflection color of a glazing having switchable optical properties can be obtained. The external reflection color is independent of the switching state of the glazing and of the observation angle and can be freely selected by the choice of the material and the thickness of the reflection layer.

LIST OF REFERENCE CHARACTERS (1) transparent substrate
(2) reflection layer
(3) switchable functional element
(4) transparent cover pane
(5) thermoplastic intermediate layer
(5.2) first thermoplastic film
(5.2) second thermoplastic film
(6) other pane
(7) spacer
(8) heat protection coating
(9) first flat electrode of the functional element 3
(10) second flat electrode of the functional element 3
(11) functional layer of the functional element 3
(12) second thermoplastic intermediate layer
(13) ion storage layer of the functional element 3
(14) electrolytic layer of the functional element 3
I outer surface of the transparent substrate 1
II inner surface of the transparent substrate 1
III outer surface of the cover pane 4
IV inner surface of the cover pane 4

The invention claimed is:

1. A glazing having switchable optical properties, comprising at least:
    a transparent substrate having an outer surface and an inner surface,
    a reflection layer on the outer surface and/or on the inner surface, and
    a switchable functional element arranged on the interior side relative to the reflection layer,
    wherein the functional element is an electrochromic, a PDLC, an SPD, a thermochromic, a gasochromic, a photochromic, a photoelectrochromic, or a thermotropic functional element,
    wherein the reflection layer contains a material having a refractive index $n_R$ from 1.6 to 2.55 and wherein the product of the refractive index $n_R$ and the thickness d of the reflection layer is from 250 nm to 960 nm, and wherein the reflection layer is a single and homogeneous layer so that the reflection is not a layer structure of individual layers.

2. The glazing according to claim 1, wherein the substrate is bonded to a transparent cover pane having an outer surface and an inner surface via the inner surface by means of at least one thermoplastic intermediate layer and wherein the functional element is arranged on the outer surface, on the inner surface, or in the thermoplastic intermediate layer.

3. The glazing according to claim 1, wherein the substrate is bonded to a transparent cover pane having an outer surface and an inner surface via the inner surface by means of at least one spacer and wherein the functional element is arranged on the outer surface or on the inner surface.

4. The glazing according to claim 1, wherein the reflection layer is arranged on the outer surface and the functional element is arranged on the inner surface.

5. The glazing according to claim 1, wherein the reflection layer contains at least silicon nitride, tin oxide, silicon oxynitride, zinc oxide, zirconium oxide, aluminum nitride, indium tin oxide, tin zinc oxide, titanium zinc oxide, and/or titanium silicon oxide.

6. The glazing according to claim 1, wherein the product of the refractive index $n_R$ and the thickness d of the reflection layer is from 365 nm to 400 nm, or from 730 nm to 800 nm.

7. The glazing according to claim 6, wherein the product of the refractive index $n_R$ and the thickness d of the reflection layer is from 375 nm to 390 nm.

8. The glazing according to claim 6, wherein the product of the refractive index $n_R$ and the thickness d of the reflection layer is from 750 nm to 780 nm.

9. The glazing according to claim 1, wherein the product of the refractive index $n_R$ and the thickness d of the reflection layer is from 435 nm to 480 nm, or from 870 nm to 960 nm.

10. The glazing according to claim 9, wherein the product of the refractive index $n_R$ and the thickness d of the reflection layer is from 440 nm to 475 nm.

11. The glazing according to claim 9, wherein the product of the refractive index $n_R$ and the thickness d of the reflection layer is from 880 nm to 950 nm.

12. The glazing according to claim 1, wherein the product of the refractive index $n_R$ and the thickness d of the reflection layer is from 305 nm to 365 nm, or from 610 nm to 730 nm.

13. The glazing according to claim 12, wherein the product of the refractive index $n_R$ and the thickness d of the reflection layer is from 320 nm to 345 nm.

14. The glazing according to claim 12, wherein the product of the refractive index $n_R$ and the thickness d of the reflection layer is from 640 nm to 690 nm.

15. The glazing according to claim 1, wherein the product of the refractive index $n_R$ and the thickness d of the reflection layer is from 250 nm to 300 nm, or from 500 nm to 600 nm.

16. The glazing according to claim 15, wherein the product of the refractive index $n_R$ and the thickness d of the reflection layer is from 270 nm to 285 nm.

17. The glazing according to claim 15, wherein the product of the refractive index $n_R$ and the thickness d of the reflection layer is from 540 nm to 570 nm.

18. The glazing according to claim 1, wherein the substrate contains non-prestressed, partially prestressed, or prestressed glass, or clear plastics and/or mixtures thereof.

19. The glazing according to claim 18, wherein the substrate contains flat glass, float glass, quartz glass, borosilicate glass, or soda lime glass.

20. The glazing according to claim 18, wherein the substrate contains polyethylene, polypropylene, polycarbonate, polymethyl methacrylate, polystyrene, polyamide, polyester, or polyvinyl chloride.

21. The glazing according to claim 18, wherein the substrate has a thickness from 20 μm to 10 mm.

22. A method comprising:
providing the reflection layer in the glazing according to claim 1;
selecting a refractive index $n_R$ from 1.6 to 2.55 and selecting a thickness d, wherein the product of the refractive index $n_R$ and the thickness d of the reflection layer is from 250 nm to 960 nm; and thereby controlling the external reflection color.

23. A method for producing a glazing having switchable optical properties, comprising at least: a transparent substrate having an outer surface and an inner surface, a reflection layer on the outer surface and/or on the inner surface, and a switchable functional element arranged on the interior side relative to the reflection layer, wherein the functional element is an electrochromic, a PDLC, an SPD, a thermochromic, a gasochromic, a photochromic, a photoelectrochromic, or a thermotropic functional element, wherein the reflection layer contains a material having a refractive index $n_R$ from 1.6 to 2.55 and wherein the product of the refractive index $n_R$ and the thickness d of the reflection layer is from 250 nm to 960 nm, and wherein the reflection layer is a single and homogeneous layer so that the reflection is not a layer structure of individual layers, comprising at least:
applying the reflection layer on the outer surface or on the inner surface of the transparent substrate,
applying the switchable functional element on the outer surface or on the inner surface of a transparent cover pane or incorporating the switchable functional element into a thermoplastic intermediate layer, and
bonding the transparent substrate to the transparent cover pane via the thermoplastic intermediate layer under the action of heat, vacuum, and/or pressure.

24. A method for producing a glazing having switchable optical properties, comprising at least: a transparent substrate having an outer surface and an inner surface, a reflection layer on the outer surface and/or on the inner surface, and a switchable functional element arranged on the interior side relative to the reflection layer, wherein the functional element is an electrochromic, a PDLC, an SPD, a thermochromic, a gasochromic, a photochromic, a photoelectrochromic, or a thermotropic functional element, wherein the reflection layer contains a material having a refractive index $n_R$ from 1.6 to 2.55 and wherein the product of the refractive index $n_R$ and the thickness d of the reflection layer is from 250 nm to 960 nm, and wherein the reflection layer is a single and homogeneous layer so that the reflection is not a layer structure of individual layers, comprising at least:
applying the reflection layer on the outer surface or on the inner surface of the transparent substrate,
applying the switchable functional element on the outer surface or on the inner surface of a transparent cover pane, and
bonding the transparent substrate to the transparent cover pane via at least one spacer.

25. A method for producing a glazing having switchable optical properties, comprising at least: a transparent substrate having an outer surface and an inner surface, a reflection layer on the outer surface and/or on the inner surface, and a switchable functional element arranged on the interior side relative to the reflection layer, wherein the functional element is an electrochromic, a PDLC, an SPD, a thermochromic, a gasochromic, a photochromic, a photoelectrochromic, or a thermotropic functional element, wherein the reflection layer contains a material having a refractive index $n_R$ from 1.6 to 2.55 and wherein the product of the refractive index $n_R$ and the thickness d of the reflection layer is from 250 nm to 960 nm, and wherein the reflection layer is a single and homogeneous layer so that the reflection is not a layer structure of individual layers, comprising at least:
applying the reflection layer on the outer surface of the transparent substrate and
applying the switchable functional element on the inner surface of the transparent substrate.

* * * * *